US010919155B2

(12) United States Patent
Charbonnet

(10) Patent No.: US 10,919,155 B2
(45) Date of Patent: Feb. 16, 2021

(54) SYSTEM FOR CONTROLLED DISTRIBUTION OF COMPONENTS

(71) Applicant: ETA SA Manufacture Horlogere Suisse, Grenchen (CH)

(72) Inventor: Frederic Charbonnet, Basse-Nendaz (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 130 days.

(21) Appl. No.: 16/214,697

(22) Filed: Dec. 10, 2018

(65) Prior Publication Data
US 2019/0193270 A1   Jun. 27, 2019

(30) Foreign Application Priority Data

Dec. 21, 2017 (CH) ........................................ 1589/17

(51) Int. Cl.
*B25J 9/16* (2006.01)
*B65G 47/14* (2006.01)
(Continued)

(52) U.S. Cl.
CPC ........... *B25J 9/1679* (2013.01); *B23P 19/002* (2013.01); *B23P 19/003* (2013.01); *B23P 19/004* (2013.01);
(Continued)

(58) Field of Classification Search
CPC .. B65G 27/02; B65G 47/1421; B65G 47/145; B65G 47/88; B65G 47/8876–8892;
(Continued)

(56) References Cited

U.S. PATENT DOCUMENTS 3,833,110 A * 9/1974 Riggs ................. B65G 21/2072
198/459.4
4,527,326 A 7/1985 Kohno et al.
(Continued)

FOREIGN PATENT DOCUMENTS

JP     59-182112     10/1984
JP     5-132121      5/1993
(Continued)

OTHER PUBLICATIONS

Translation of JPH08231020 (Year: 1996).*
(Continued)

*Primary Examiner* — Matthew P Travers
(74) *Attorney, Agent, or Firm* — Oblon, McClelland, Maier & Neustadt, L.L.P.

(57) ABSTRACT

A system for controlled distribution of components, the system including a vibrating bowl provided with an enclosure having a wall extending right around an axis of revolution of the bowl and in which the components are placed in bulk, and an articulated gripping arm provided to distribute the components to the automatic assembly installation, the vibrating bowl including an ascending helical ramp extending along an internal face of the wall between a base and an upper edge of the vibrating bowl constituting an exit of the ramp, the components being able to travel along this ramp towards a supply platform, particularly a slide, on which at least one component is arranged in advance of its seizure by the articulated gripping arm, the supply platform being connected to the exit and extending above or in the enclosure of the vibrating bowl.

13 Claims, 2 Drawing Sheets

(51) Int. Cl.
  *B23P 19/00* (2006.01)
  *B65G 27/02* (2006.01)
  *B65G 47/26* (2006.01)
  *B65G 47/256* (2006.01)
  *B65G 47/88* (2006.01)
  *G04D 1/00* (2006.01)
  *B25J 11/00* (2006.01)
  *G05B 19/04* (2006.01)

(52) U.S. Cl.
  CPC ............ *B23P 19/007* (2013.01); *B65G 27/02* (2013.01); *B65G 47/145* (2013.01); *B65G 47/1421* (2013.01); *G05B 19/0405* (2013.01); *B25J 11/005* (2013.01); *B65G 47/1457* (2013.01); *B65G 47/256* (2013.01); *B65G 47/26* (2013.01); *B65G 47/88* (2013.01); *G04D 1/0092* (2013.01); *G05B 2219/39101* (2013.01); *G05B 2219/39508* (2013.01); *G05B 2219/45063* (2013.01); *G05B 2219/50386* (2013.01)

(58) Field of Classification Search
  CPC ...... B65G 47/26; B65G 47/28; B65G 47/256; G04D 1/0071; G04D 1/0092; G04D 99/00; B23P 19/002; B23P 19/003; B23P 19/004; B23P 19/007; Y10T 29/49579; B25J 9/1679; B25J 11/005
  See application file for complete search history.

(56) References Cited

U.S. PATENT DOCUMENTS 4,759,435 A * 7/1988 Cedrone ................ B65G 47/88
                                                      198/459.8
2010/0063629 A1   3/2010 Battisti et al.

FOREIGN PATENT DOCUMENTS

| JP | 6-115667 | 4/1994 |
| JP | 7-132421 | 5/1995 |
| JP | 8-71865 | 3/1996 |
| JP | 8-231020 | 9/1996 |

OTHER PUBLICATIONS

Translation of JPH05132121 (Year: 1993).*
European Search Report dated Aug. 3, 2018 in European application 18153535 (with English Translation of Categories of Cited Documents).
Combined Chinese Office Action and Search Report dated Jun. 29, 2020 in corresponding Chinese Patent Application No. 201811562912.2 (with English Translation and English Translation of Category of Cited Documents), 15 pages.

* cited by examiner

SYSTEM FOR CONTROLLED DISTRIBUTION OF COMPONENTS

CROSS-REFERENCE TO RELATED APPLICATION

This application claims priority to Switzerland Patent Application No. 01589/17, filed on Dec. 21, 2017, the entire disclosure of which is hereby incorporated herein by reference.

TECHNICAL FIELD

The present invention relates to a system for controlled distribution of components, particularly components for timepieces, for an installation for automatic assembly of all or part of an article produced from at least one of these components, particularly of a timepiece, and such an automatic assembly installation.

PRIOR ART

In the prior art it is known to use a vibrating bowl in a system for distributing components, for example components for timepieces, as in the context of an installation for automatic assembly of timepieces. Such a bowl is conventionally mounted on a support that generates vibrations that impart to these components for timepieces, which are generally lightly oiled, a rotational movement about a vertical axis of revolution of this bowl. Such a movement leads these components for timepieces to embark upon a ramp defined on the lateral wall of the bowl and progressively to rise to the top of this wall. In this configuration, the components arriving at this top may then embark upon a supply channel defined in the continuation of this ramp while being fixed to this lateral wall of the bowl. This supply channel extends longitudinally in a direction parallel to a tangent to an external peripheral wall of this bowl perpendicular to a plane comprising the vertical axis of revolution of this bowl. Such a channel aims to supply a distribution support defined at the top of the wall and extending towards the exterior of the bowl on which are arranged the components coming from the channel and which are to be seized by a gripping arm in order to be distributed to an assembly machine of the automatic assembly installation in advance of the production of all or part of a timepiece.

However, such systems for distributing components for timepieces often lack reliability in the context of the way in which they function. Indeed, they are regularly subject to malfunctions that may result from an excessive accumulation of components on the ramp or, alternatively, at the supply channel arising from jamming in this channel caused by these lightly oiled components or components of imperfect geometry. In such circumstances, manual intervention is systematically required in order to set the system running again.

Furthermore, it will be noted that, in these distribution systems, the components for timepieces that are not correctly seized by the gripping arm systematically fall outside the vibrating bowl, which gives rise to losses that have an impact on a not insignificant increase in the costs of production of such timepieces.

SUMMARY OF THE INVENTION

An object of the present invention is thus to propose a system for controlled distribution of components, particularly components for timepieces, which makes it possible to overcome the prior-art drawbacks by improving the reliability of the vibrating bowl constituting this system.

To this end, the invention relates to a system for controlled distribution of components, particularly components for timepieces, for an installation for automatic assembly of all or part of an article produced from at least one of these components, particularly of a timepiece, the system comprising:
  a vibrating bowl provided with an enclosure having a wall extending right around an axis of revolution of the bowl and into which said components are placed in bulk, and an articulated gripping arm provided to distribute said components to said automatic assembly installation,
the vibrating bowl comprising an ascending helical ramp extending along an internal face of said wall between a base and an upper edge of said vibrating bowl constituting an exit of said ramp, said components being able to travel along this ramp towards a supply platform, particularly a slide, on which at least one component is arranged in advance of its seizure by the articulated gripping arm, said supply platform being connected to said exit and extending above or in the enclosure of the vibrating bowl.

In other embodiments:
  the supply platform extends radially in the vibrating bowl (3) on the vertical axis;
  the supply platform extends radially in this vibrating bowl substantially from the upper edge to said vertical axis;
  the supply platform extends radially in this vibrating bowl on the vertical axis while having a free end included between the exit of the ramp and a zone of the upper edge diametrically opposite this exit relative to the vertical axis;
  the supply platform comprises first and second parts, particularly with the first part which has a length greater or substantially greater than the length of the second part;
  the first part comprises a planar upper face forming a support on which the components can move with a view to being seized by the articulated gripping arm;
  the first part extends radially, particularly in a rectilinear manner while having its upper face included in a plane comprising the upper edge of said vibrating bowl and/or an opening of the enclosure of said vibrating bowl;
  the first part extends radially, particularly in a rectilinear manner while having its upper face included in a plane parallel or substantially parallel to a plane comprising the upper edge of said vibrating bowl and/or an opening of the enclosure of said vibrating bowl;
  the first part of the supply platform comprises a distribution zone included substantially at its free end and in which zone the component for timepieces is arranged in advance of its seizure by the articulated gripping arm;
  the first part of the supply platform comprises a device for detecting the presence of the component for timepieces in the distribution zone;
  the second part of the supply platform comprises a linking portion and two guide portions;
  the linking portion is mechanically connected to a lower face of the first part;
  the guide portions are defined in order to direct the components towards the enclosure of the vibrating bowl, at least one component for timepieces initially present on the first part of this supply platform and discharged therefrom;

the vibrating bowl comprises a device for sorting/selecting the components defined close to the first part of the supply platform;

the vibrating bowl comprises a device for separating at least two components arranged above the distribution zone;

the component for timepieces is selected from components, particularly corresponding to axisymmetric objects of millimetric size; and the ramp comprises a lateral edge that is curved or substantially curved in the direction of the opening of the vibrating bowl playing a part in keeping the components on this ramp during their progression.

The invention also relates to an installation for automatic assembly of all or part of an article produced from at least one component, particularly of a timepiece, comprising at least one such system for controlled distribution of components.

Thus, by virtue of these features, the distribution system therefore makes it possible to improve the circulation of the components, particularly components for timepieces, in the vibrating bowl and also the optimization of the sorting of these latter by dispensing with a supply channel but providing a supply platform which is thus uncovered. Furthermore, the losses and damage caused to these components are limited or are practically zero owing to systematic recovery of the components progressing over the supply platform that are not seized by the articulated gripping arm.

BRIEF DESCRIPTION OF THE FIGURES

Other features and advantages of the present invention will become apparent upon reading a number of embodiments, given solely by way of non-limiting example and with reference to the appended drawings, in which.

DETAILED DESCRIPTION OF THE INVENTION

Figure 1:
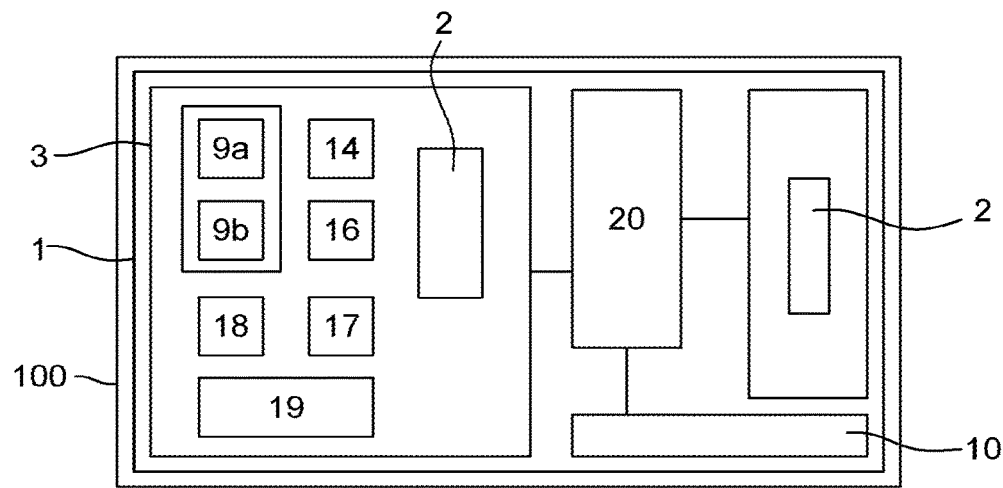
FIG. 1 is a schematic representation relating to a system for controlled distribution of components for timepieces for an installation for automatic assembly of all or part of a timepiece, according to one embodiment of the invention.
Figure 2:
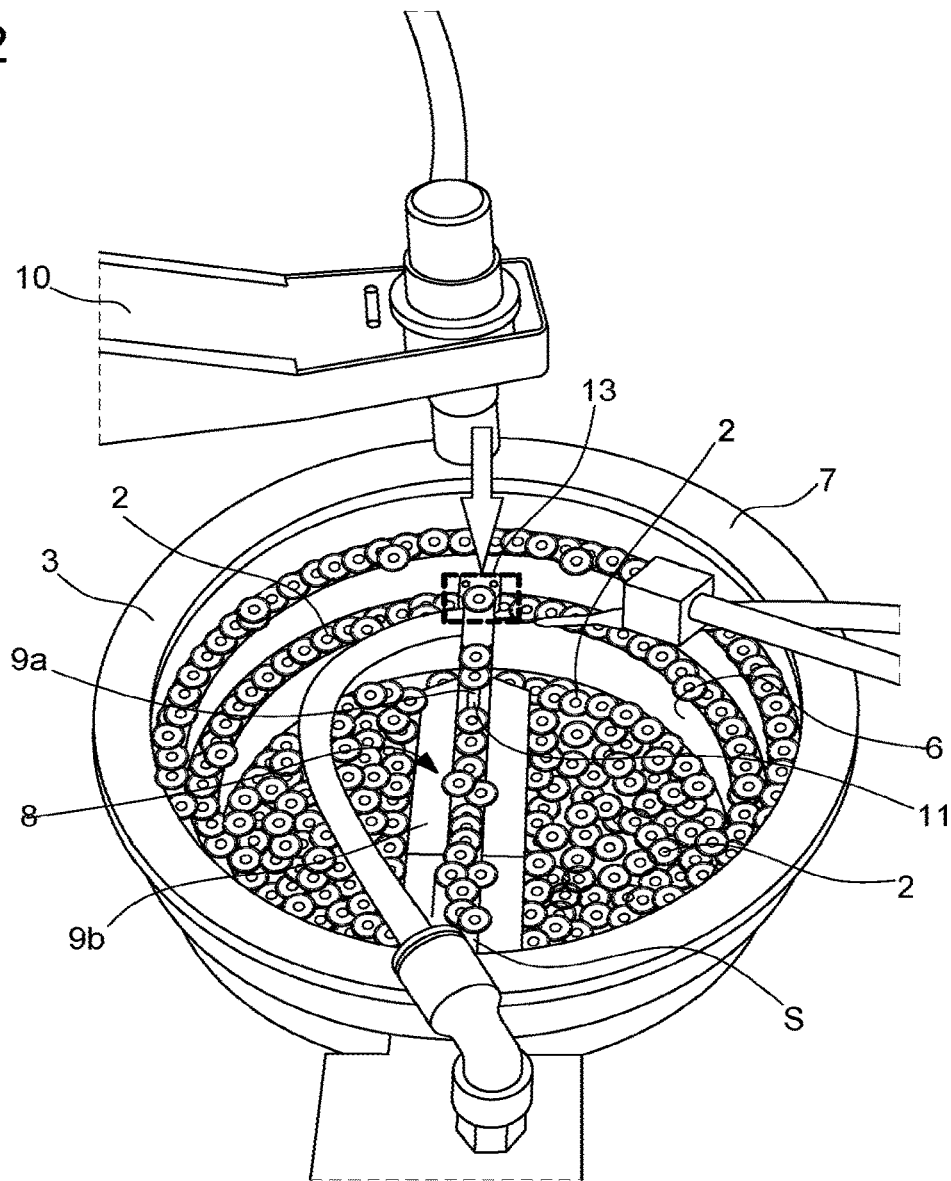
FIG. 2 is a top view of a first variant embodiment of a vibrating bowl of the distribution system according to the embodiment of the invention.

With reference to FIG. 1, the system 1 for controlled distribution of components 2, particularly of components 2 for timepieces, comprises a vibrating bowl 3 and an articulated gripping arm 10 and also a control unit 20 involved wholly or partly in the functioning of this system 1.

In the present embodiment of the invention, the distributed components 2 are components 2 for timepieces. It will be understood that any type of component whatsoever may be distributed by this system 1, particularly when it is an object of millimetric size, particularly of less than 20 mm. Such a system 1 is provided to distribute components 2 for timepieces to a machine of an automatic assembly installation 100 or line for automatic assembly of all or part of a timepiece. It will be noted that the components 2 for timepieces distributed in this system 1 are preferably axisymmetric objects of millimetric size, particularly of less than 20 mm.

In this system 1 the bowl 3 is provided with an enclosure 4 open at an opening 12 defined by an upper edge 7 of this bowl 3. This bowl 3 comprises a vertical axis of revolution that is perpendicular or substantially perpendicular to a plane comprising the opening 12 giving access to the enclosure 4 of this bowl 3. In this configuration, the enclosure 4 comprises a wall 6 that extends right around this axis of revolution such as to confer on this bowl 3 a general form of a dish into which said components 2 for timepieces are placed in bulk. Such a bowl 3 is caused to vibrate relative to its fixed pedestal by means of electromechanical elements that are not detailed here.

This bowl 3 comprises an ascending helical ramp 5 extending along an internal face of said wall 6 between a base and an upper edge 7 of this bowl 3. Such a ramp 5 is preferably made as a single piece with this wall 6. In particular, this ramp 5 comprises an entry defined at the base of this bowl 3 and an exit S included in the upper edge 7 of the bowl 3. Such a ramp 5 contributes to ensuring the progress of the components 2 for timepieces initially tipped in bulk into this bowl 3 from the base towards the exit S of this ramp 5 which opens out on a supply platform 8. More precisely, the electromechanical elements make it possible to confer a vibrating movement on the bowl 3, about its axis of revolution, in order to cause the components 2 for timepieces contained in the bowl 3 to travel along, particularly one after another, towards this supply platform 8. It will be noted that the ramp 5 has a cross section perpendicular to the axis of revolution of the bowl 3 that is non-linear. Indeed, this ramp 5 comprises a lateral edge that is curved or substantially curved in the direction of the opening 12 of the bowl 3 giving access to its enclosure 4. Such a curved lateral edge 21 aims to play a part in keeping the components 2 for timepieces on this ramp 5 during their progression over this ramp 5.

In this bowl 3, the supply platform 8, otherwise called a slide, is arranged in the bowl 3 in order to receive the components for timepieces coming from the ramp 5 and to play a part in a selection/sorting of the components 2 for timepieces that do not have an expected orientation that is likely to ensure that they will be optimally seized by the articulated gripping arm 10 in advance of their distribution in the installation 100 for automatic assembly of all or part of a timepiece.

Such a supply platform 8 is preferably an added piece that is fixed to the exit S of the ramp 5, forming an angle perpendicular or substantially perpendicular with the wall 6 of the bowl 3. In this bowl 3, this supply platform 8 extends above the enclosure 4 or in the enclosure 4 of this bowl 3. More precisely, the presentation element extends radially in this vibrating bowl 3 on the axis of revolution of the bowl 3. In other words, the presentation element extends radially in this vibrating bowl 3 substantially from the upper edge 7 to said axis of revolution. Furthermore, the presentation element extends radially in this vibrating bowl 3 on the axis of revolution while having a free end included between the exit S of the ramp 5 and a zone of the upper edge 7 diametrically opposite this exit S relative to the axis of revolution. In this configuration, it will thus be understood that the body of this supply platform 8 is, overall, arranged above the enclosure 4 or in the enclosure 4 of this bowl 3.

Such a supply platform 8 comprises first and second parts 9a, 9b having different functions within the context of the functioning of this bowl 3. In this configuration, the first part 9a has a length greater or substantially greater that the length of the second part 9b.

This first part 9a is a plate comprising upper and lower faces having a preferably rectangular cross section. The upper and lower faces are preferably planar. In particular, the upper face forms a support on which the components 2 for timepieces coming from the ramp 5 can move with a view to being seized by the gripping arm 10. It will be noted that such an upper face may comprise a groove 11 extending longitudinally in this face in order to play a part in a configuration of the orientation of the component 2 for timepieces in advance of its seizure by the gripping arm 10. Such an upper face extends radially, particularly in a rectilinear manner while having its external face included in a plane comprising the upper edge 7 of said vibrating bowl 3 and/or a plane comprising the opening 12 of the enclosure 4 of said vibrating bowl 3. In a variant embodiment, this upper face is included in a plane parallel or substantially parallel to a plane comprising the upper edge 7 of said vibrating bowl 3 and/or the opening 12 of the enclosure 4 of said vibrating bowl 3. This first part 9a comprises a free end provided with a zone for positioning the component to be seized by the articulated gripping arm 10.

In this supply platform 8, the second part 9b comprises a linking portion and two guide portions 15. This second part 9b has a cross section of essentially trapezoidal form with the two guide portions 15 which each form an obtuse angle with the linking portion. In this configuration, the linking portion is mechanically connected to a lower face of the first part 9a of the supply platform 8 and the guide portions 15 are provided in order to direct the one or more components 2 for timepieces which have been discharged from this platform, particularly by a sorting device described below. These guide portions 15 make it possible, under these conditions, systematically to orient these components in the enclosure 4 irrespective of the lateral side of the platform that they have been caused to leave in order to reach this enclosure 4.

In this supply platform 8, the lower face of the first part 9a is mechanically connected to the linking portion of the second part 9b by welding, adhesive bonding or, alternatively, nesting. In an alternative, this lower face may be made as a single piece with this linking portion such that these first and second parts 9a, 9b form a monobloc unit.

As previously stated, the bowl 3 also comprises a device 14 for detecting the presence of the component 2 for timepieces arranged in the distribution zone 13 of the supply platform 8. Such a detector comprises, for example, at least one vacuum pressure sensor and/or at least one optical sensor. This presence detector 14 is preferably arranged in the supply platform 8, in particular at this distribution zone.

This bowl 3 may also comprise a device 16 for sorting/selection of the components 2 for timepieces which is positioned close to the first part 9a of the inlet platform. Such an arrangement of the sorting/selection device 16 relative to this first part 9a makes it possible for the latter to be able to discharge, from the upper face of this part, the one or more components 2 for timepieces that do not have a correct orientation in order to be able to ensure their optimal seizure by the gripping arm 10 when they are positioned in the distribution zone 13. Such a sorting/selection device 16 comprises at least one element for projecting/spraying a fluid, such as an air nozzle connected to an air compressor. In this bowl 3, two air nozzles are arranged upstream of the distribution zone 13, in particular at a section of travel covered by the components 2 for timepieces over the upper face of the first part 9a located between the exit S of the ramp 5 and the middle of this upper face.

The bowl 3 also comprises a device for protecting the component 2 for timepieces that is arranged in the distribution zone 13 in advance of the seizure thereof by the gripping arm 10. This protection device also comprises at least one element for projecting/spraying a fluid, such as an air nozzle connected to an air compressor. In this bowl 3, this air nozzle is preferably close to a portion of the upper face arranged in front of the distribution zone 13, which it adjoins, such as to be able to spray/project a stream of air into this portion when a component 2 for timepieces is arranged in the distribution zone 13.

Figure 3:
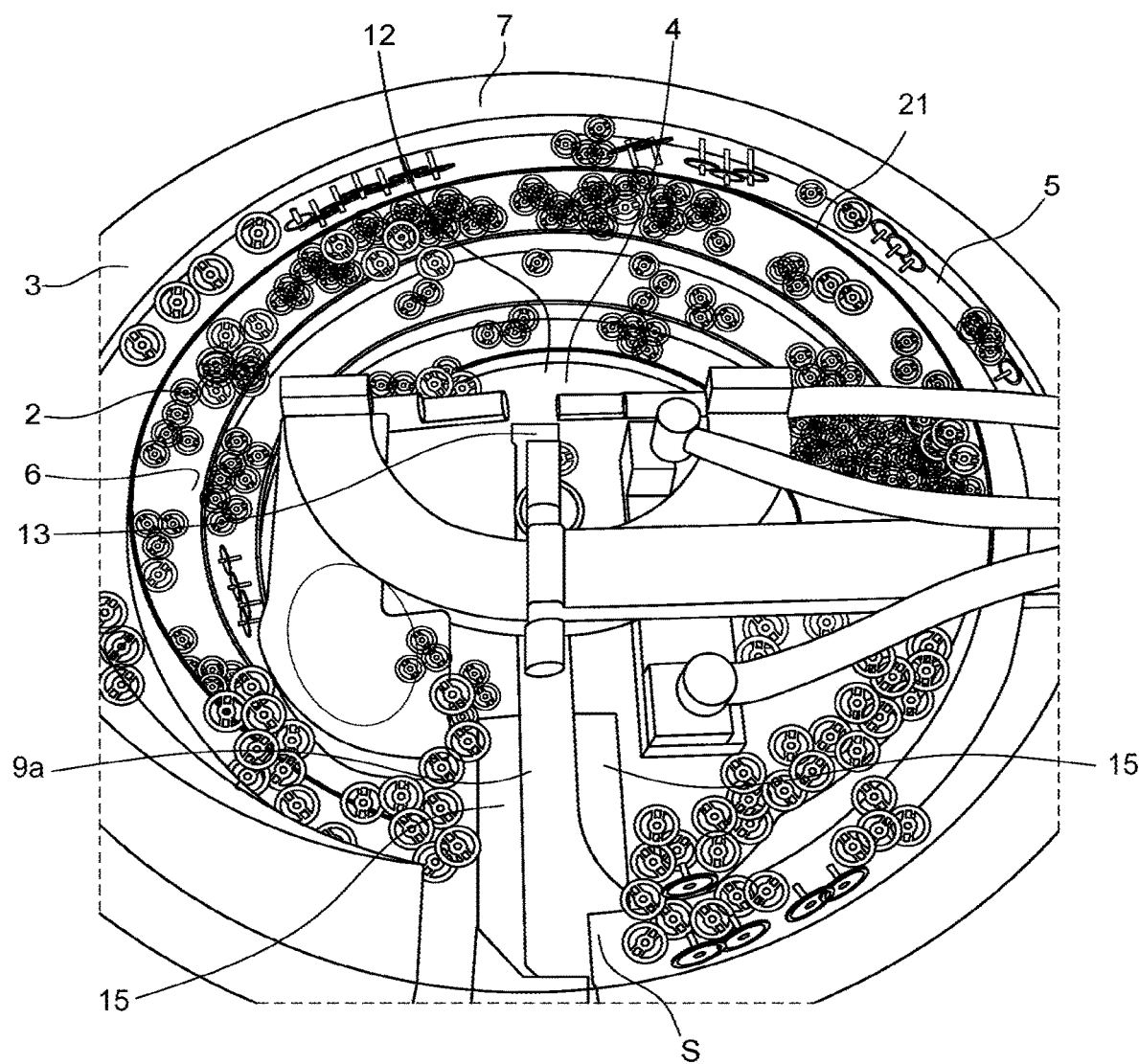
FIG. 3 is a top view of a second variant embodiment of the vibrating bowl of the distribution system according to the embodiment of the invention.

This bowl 3 also comprises a device 17 for separating at least two components 2 for timepieces arranged above the distribution zone 13. This device comprises at least two flexible elements mounted on a fixed arm with the aim of positioning them above this distribution zone 13. In the variant embodiment of the bowl 3 visible in FIG. 3, this bowl 3 comprises three flexible elements, the free ends of which are positioned in order for there to be a gap between them that is smaller or substantially smaller than the volume of the component 2 for timepieces, in order to separate two of these components 2 for timepieces that might be adhering to one another on account of the oily matter with which they may be totally or partially coated. In this context, the component 2 for timepieces seized by the gripping arm 10 is then distributed in the automatic assembly installation 100 and the other component 2 for timepieces is directed towards the enclosure 4 of the bowl 3.

It will be noted that the use of air in the sorting/selection and protection devices makes it possible to cause a component 2 for timepieces to move without suffering damage.

In this system 1, as seen, the articulated gripping arm 10 is provided in order to distribute said components 2 for timepieces to said automatic assembly installation 100.

This system 1 also comprises a control unit 20 connected to the bowl 3, in particular to components of this bowl 3 such as: the sorting device, the separation device 17 (depending on the vibrating bowl 3 variant), the presence detector 14, the protection device and the electromechanical elements. This control unit 20 is also connected to the articulated gripping arm 10 and also to a device for supplying the device 3 with components 2 for timepieces of this system 1. Such a control unit 20 may be a computer and comprises hardware and software resources, in particular at least one processor interacting with memory elements. This control unit 20 can execute instructions for implementing a computer program for monitoring the bowl 3 and the gripping arm 10 within the context of the distribution of these components 2 for timepieces in the automatic assembly installation 100.

In this context, this system 1 makes it possible to implement a method for controlled distribution of components 2 for timepieces. This method comprises a step of placing lightly oiled components 2 for timepieces to be distributed into the enclosure 4 of the bowl 3. In the course of this step, the control unit 20 then monitors the device for supplying the bowl 3 with components 2 for timepieces. Next, in the course of a functioning step of the bowl 3, the control unit 20 activates the electromechanical elements so as to cause the bowl 3 to vibrate relative to its fixed pedestal and to cause the travel of the components 2 for timepieces along this ramp 5 until they arrive, preferably one after another, on the upper face of the supply platform 8. On the section of travel of these components 2 for timepieces over the upper face defined between the exit S and as far as one half of this travel, these components 2 for timepieces are exposed to a stream of air coming from the sorting/selection device 16 of the bowl 3 which aims to separate those amongst them that do not have a correct orientation in advance of their seizure by the articulated gripping arm 10. The components 2 for timepieces that under these conditions are discharged from this upper face are then systematically directed by the guide portions 15 of the supply platform 8 towards the enclosure 4 of the bowl 3. The components 2 for timepieces that are still present on the upper face and that thus have a correct orientation are, for their part, through the effect of the vibrations, conveyed one by one towards the distribution zone 13. In this context, when a component 2 for timepieces arrives in the distribution zone 13, the presence detector 14 identifies the positioning of the component 2 for timepieces in this zone and transmits a signal to this effect to the control unit 20 that then triggers the process of seizure of this component by the articulated gripping arm 10 in advance of its distribution in the automatic assembly installation 100 and triggering of the protection device that projects/sprays a stream of air in the portion of the upper face juxtaposed relative to the distribution zone 13 in order to discharge from this portion any component 2 for timepieces that might be likely to be directed towards this distribution zone 13 during the seizure process. It will advantageously be noted that such seizure of this component 2 for timepieces is thus achieved above or in the enclosure 4 of the bowl 3, making it possible, in the event of any fall of the component 2 for timepieces, that said component returns to this enclosure 4.

The invention claimed is:

1. A system for controlled distribution of components for timepieces, for an installation for automatic assembly of all or part of an article produced from at least one of said components, the system comprising:
   a vibrating bowl provided with an enclosure having a wall extending around a vertical axis of revolution of the bowl and wherein said components are placed in bulk, and
   an articulated gripping arm provided to distribute said components to said automatic assembly installation,
   the vibrating bowl comprising an ascending helical ramp extending along an internal face of said wall between a base and an upper edge of said vibrating bowl constituting an exit of said ramp, said components being able to travel along this ramp towards a supply platform including a first part having an upper face on which at least one component travels from said exit to a distribution zone to be seized by the articulated gripping arm, said supply platform including a second part positioned below said first part and including a linking portion connected to a lower face of said first part and guide portions positioned on two sides of said linking portion in a width direction and forming an obtuse angle with the linking portion, said supply platform being connected to said exit and extending above or in the enclosure of the vibrating bowl, said guide portions configured to direct improperly oriented components discharged from the upper face to the enclosure of the vibrating bowl.

2. The system according to claim 1, wherein:
   the supply platform extends radially in the vibrating bowl on the vertical axis, or
   the supply platform extends radially in said vibrating bowl substantially from the upper edge to said vertical axis, or
   the supply platform extends radially in said vibrating bowl on the vertical axis while having a free end included between the exit of the ramp and a zone of the upper edge diametrically opposite said exit relative to the vertical axis.

3. The system according to claim 1, wherein the first part has a length greater than a length of the second part.

4. The system according to claim 1, wherein the upper face of the first part is planar.

5. The system according to claim 1, wherein the first part extends radially in a rectilinear manner and the upper face of the first part is included:
   in a plane comprising the upper edge of said vibrating bowl and/or an opening of the enclosure of said vibrating bowl, or
   in a plane parallel or substantially parallel to a plane comprising the upper edge of said vibrating bowl and/or an opening of the enclosure of said vibrating bowl.

6. The system according to claim 1, wherein the distribution zone is included substantially at a free end of the first part and the at least one component for timepieces is arranged in the distribution zone prior to being seized by the articulated gripping arm.

7. The system according to claim 6, wherein the first part of the supply platform comprises a device for detecting the presence of the at least one component for timepieces in the distribution zone.

8. The system according to claim 1, wherein the vibrating bowl comprises a device for sorting/selecting the components prior to entering the first part of the supply platform.

9. The system according to claim 1, wherein the vibrating bowl comprises a device for separating at least two components arranged above the distribution zone.

10. The system according to claim 1, wherein the components for timepieces are selected from components corresponding to axisymmetric objects of millimetric size.

11. The system according to claim 1, wherein the ramp comprises a lateral edge that is curved or substantially curved in a direction of an opening of the vibrating bowl to keep the components on the ramp during their progression.

12. The system according to claim 1, wherein the second part has a trapezoidal cross section.

13. An installation for automatic assembly of all or part of an article produced from at least one component, comprising at least one system for controlled distribution of components according to claim 1.

* * * * *